US011143228B2

(12) United States Patent
Feyers et al.

(10) Patent No.: US 11,143,228 B2
(45) Date of Patent: Oct. 12, 2021

(54) LOCATOR GUIDE EXTENSION

(71) Applicant: Magna Exteriors Inc., Concord (CA)

(72) Inventors: Robert W. Feyers, Clinton Township, MI (US); Theodore J. Bachelder, Vanderbilt, MI (US); Ronald J. Andor, East Jordan, MI (US)

(73) Assignee: Magna Exteriors Inc., Concord (CA)

( * ) Notice: Subject to any disclaimer, the term of this patent is extended or adjusted under 35 U.S.C. 154(b) by 189 days.

(21) Appl. No.: 16/094,931

(22) PCT Filed: Apr. 19, 2017

(86) PCT No.: PCT/IB2017/052258
§ 371 (c)(1),
(2) Date: Oct. 19, 2018

(87) PCT Pub. No.: WO2017/182969
PCT Pub. Date: Oct. 26, 2017

(65) Prior Publication Data
US 2019/0128305 A1  May 2, 2019

Related U.S. Application Data

(60) Provisional application No. 62/324,687, filed on Apr. 19, 2016.

(51) Int. Cl.
*F16B 19/02* (2006.01)
*F16B 5/06* (2006.01)
(Continued)

(52) U.S. Cl.
CPC ............. *F16B 19/02* (2013.01); *B62D 24/00* (2013.01); *F16B 5/0628* (2013.01); *F16B 21/086* (2013.01)

(58) Field of Classification Search
CPC ...... F16B 19/02; F16B 21/086; F16B 5/0628; Y10T 29/49895; Y10T 29/49904;
(Continued)

(56) References Cited

U.S. PATENT DOCUMENTS 3,249,973 A * 5/1966 Seckerson ............. F16B 5/0657
411/509
3,509,618 A * 5/1970 Siler ....................... F16B 19/02
29/467
(Continued)

FOREIGN PATENT DOCUMENTS

CN  202971489 U  6/2013
CN  203516356 U  4/2014
(Continued)

OTHER PUBLICATIONS

NPL#1: Threaded Taper Pins, Standard Horse Nail Company LLC, Feb. 23, 2016, <https://web.archive.org/web/20160223015633/http://www.stanho.com/threaded-taper-pins.html> (Year: 2016).*
(Continued)

*Primary Examiner* — Victor D Batson
*Assistant Examiner* — Amit Singh Dhillon
(74) *Attorney, Agent, or Firm* — Warn Partners, P.C.

(57) ABSTRACT

A locator guide extension connected to a locator on a host component by at least one retention barb or like feature. The locator guide extension effectively extends the length of the locator to assists an operator in the initial alignment of the host component part to the assembly. An operator locates apertures in the assembly with the locator guide extension prior to inserting attachment clips of the host component. Once initially aligned, the operator pushes the locator guide extension and locator into the aperture, where the locator provides the final fit/finish location. The attachment clip connects the host component to the final assembly.

17 Claims, 3 Drawing Sheets

(51) Int. Cl.
*F16B 21/08* (2006.01)
*B62D 24/00* (2006.01)

(58) Field of Classification Search
CPC ............ Y10T 24/44026; Y10T 24/309; Y10T 24/45105; B60R 13/0206; B62D 65/02; B62D 65/04; B62D 24/00
See application file for complete search history.

(56) References Cited

U.S. PATENT DOCUMENTS

| | | | | |
|---|---|---|---|---|
| 3,897,713 | A * | 8/1975 | Gugle | F16B 25/0068 411/389 |
| 4,312,165 | A * | 1/1982 | Mizusawa | B60R 13/0206 411/510 |
| 5,947,547 | A * | 9/1999 | Deeks | B60R 13/02 296/146.6 |
| 8,528,259 | B1 * | 9/2013 | Heirtzler | E05F 11/382 49/506 |
| 2006/0043764 | A1 * | 3/2006 | Schroder | B60R 13/0243 296/146.7 |
| 2006/0242802 | A1 * | 11/2006 | Scroggie | F16B 5/0657 24/297 |
| 2007/0138835 | A1 * | 6/2007 | Kapadia | B62D 25/084 296/193.09 |
| 2009/0236492 | A1 * | 9/2009 | Richason | H05K 7/1412 248/672 |
| 2011/0194890 | A1 * | 8/2011 | Chang | F16B 12/24 403/241 |
| 2011/0227266 | A1 * | 9/2011 | Midali | F16B 19/02 269/47 |
| 2011/0236156 | A1 * | 9/2011 | Rottinghaus | F16B 21/086 411/508 |
| 2013/0152579 | A1 * | 6/2013 | Neumann | F16B 13/0816 60/592 |
| 2013/0255065 | A1 * | 10/2013 | Bachelder | F16B 21/09 29/525.01 |
| 2013/0343810 | A1 * | 12/2013 | Summers | F16B 5/00 403/292 |
| 2015/0322985 | A1 * | 11/2015 | Scroggie | F16B 5/0084 29/428 |
| 2016/0121810 | A1 * | 5/2016 | Stanczak | B60R 13/0206 296/1.08 |
| 2016/0214547 | A1 * | 7/2016 | Iriarte Jimenez | B60R 13/0218 |
| 2017/0246995 | A1 * | 8/2017 | Sanchez Cruz | B60R 13/0225 |
| 2017/0276162 | A1 * | 9/2017 | Lippitt | F16B 19/02 |

FOREIGN PATENT DOCUMENTS

| | | |
|---|---|---|
| CN | 204936996 U | 1/2016 |
| EP | 1858111 A1 | 11/2007 |
| JP | 2004230969 A | 8/2004 |
| WO | 2007041583 A1 | 4/2007 |

OTHER PUBLICATIONS

International Search Report for International Application No. PCT/IB2017/052258, dated Aug. 3, 2017.

* cited by examiner

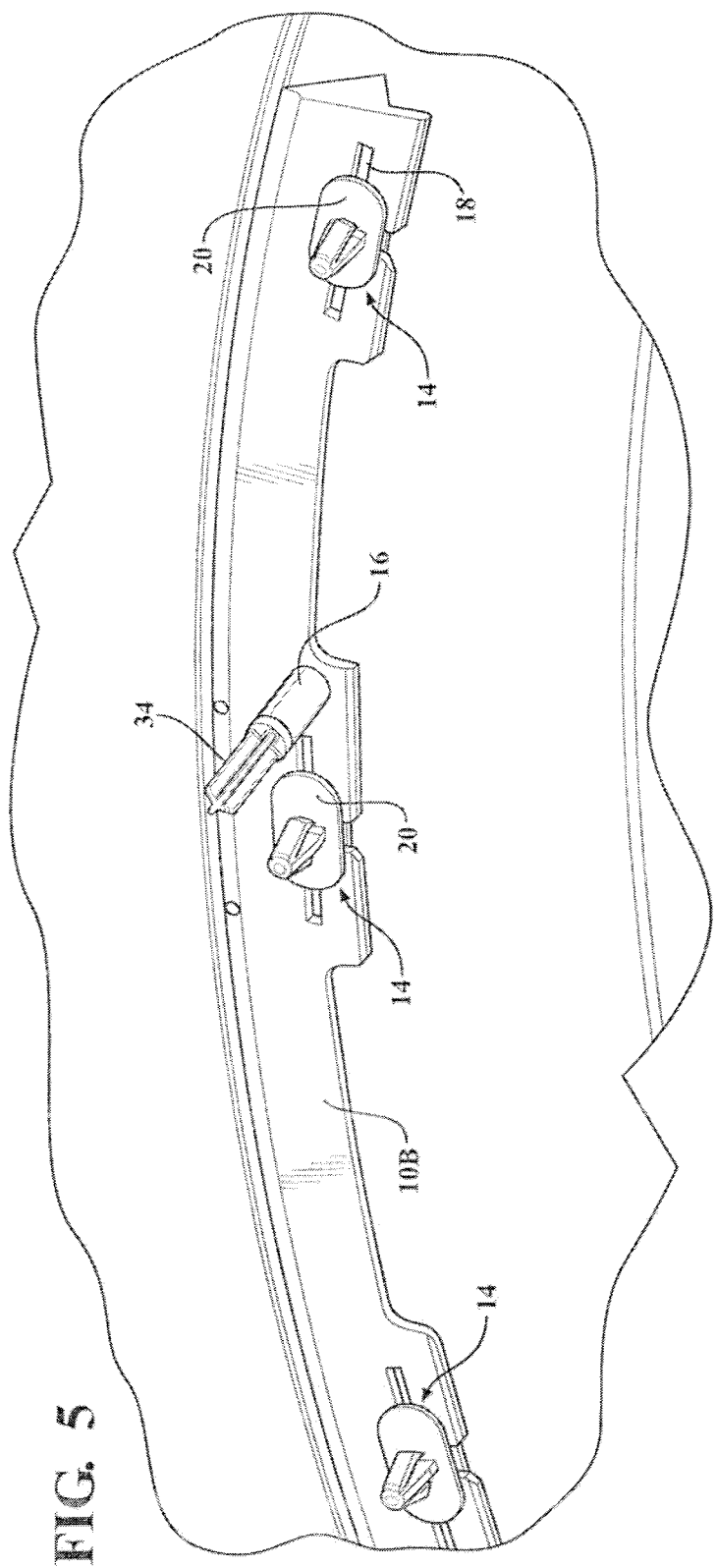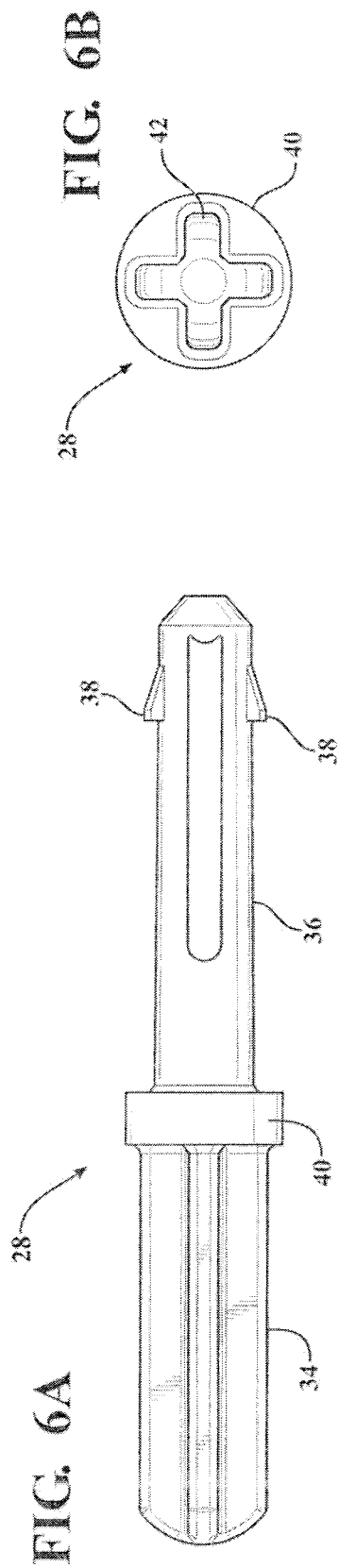

LOCATOR GUIDE EXTENSION

CROSS-REFERENCE TO RELATED APPLICATIONS

This application is a National Stage of PCT International Patent Application No. PCT/162017/052258, filed Apr. 19, 2017, which claims the benefit of U.S. Provisional Patent Application No. 62/324,687, filed Apr. 19, 2016. The disclosures of the above applications are incorporated herein by reference.

FIELD OF THE INVENTION

The present invention relates to an insert to assist in the initial alignment of a component with a final assembly and method for same.

BACKGROUND OF THE INVENTION

The components of an automobile are connected together in many different ways. One type of connection uses a fastener, such as a bolt or screw. The packaging space in vehicles is often very limited due to the number of components used to assemble the vehicle, the size of the vehicle, and the like. Some of the area between components, such as a B-pillar and an appliqué, is very limited. This requires some of the fastener designs to be very small. Other design requirements are necessitating very low profile exterior ornamentations that present extremely low profile attachment challenges in order to attach to a component body.

One type of connector used for attaching a component to an assembly is a molded attachment clip with a standard plastic winged clip portion. Typically, the components have molded in locators for aligning the attachment clips to the attachment location provided on the assembly. However, tooling constraints often prevent the part locators from being much longer than the attachment clips themselves. Unless part locators find their respective holes in the part prior to attachment clips finding their respective holes in that part, there is a high risk of the attachment clips not engaging and part fit being compromised.

Accordingly, there exists a need for a guide feature that assists in effective and efficient alignment of the component part to the final assembly.

SUMMARY OF THE INVENTION

The present invention generally relates to a locator guide extension connected to a locator on a host component by at least one retention feature. The locator guide extension effectively extends the length or height of the locator to assist an operator in the initial alignment of the host component part to another component of a final assembly. An operator first locates a respective aperture in the second component using the locator guide extension prior to inserting attachment clips of the host component into respective apertures of the second component. This necessarily aligns both the locator guide extension and locator, and, generally, the attachment clips with their respective attachment locations provided on the assembly. The operator inserts the locator guide extension and locator into the aperture and the locator provides the final fit/finish location. Inserting the locator guide extension/locator allows the aligned attachment clips to be inserted into respective apertures for the clips as well. The attachment clip connects the host component to the assembly. The locator guide extension is a one-time use item after insertion of the locator and attachment clip, and, preferably, remains with the assembled components, out of view and generally will not interfere with or produce visible defects on the finished side of the assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a perspective view illustrating the host part connected to the attachment clip and the locator of the host part connected to the locator guide extension, with the second part omitted for clarity, according to the present invention;

FIG. 6A is a side elevation of the locator guide extension according to the present invention; and, FIG. 6B is a top plan view of the locator guide extension, according to the present invention.

DETAILED DESCRIPTION OF THE PREFERRED EMBODIMENTS

The following description of the preferred embodiment(s) is merely exemplary in nature and is in no way intended to limit the invention, its application, or uses.

Referring to the Figures generally, the present invention is directed generally to a locator guide extension that assists the operator in the initial alignment of the component part to the final assembly before the locator can provide final fit/finish location. The objective of this locator guide extension is to assist the operator in the initial alignment of the component part to the final assembly. Typically, the locator guide extension is a single plastic component that inserts into a hollow boss locator on a host part and snaps with at least one retention barb or other suitable attachment feature. Preferably, the locator guide extension fits to a 6.5 inch diameter hollow boss. In a preferred embodiment, the locator guide extension is not intended to be a locator itself; rather, it is a one-time use item that has no purpose after the host part is properly located to the vehicle. Unless part locators find their respective holes prior to attachment clips, there is a high risk of attachment clips not engaging and part fit is compromised. Since conventional tooling constraints often prevent existing part locators from being much longer than the attachment clips, the locator guide extension effectively extends the length from the locator for alignment purposes.

Figure 1:
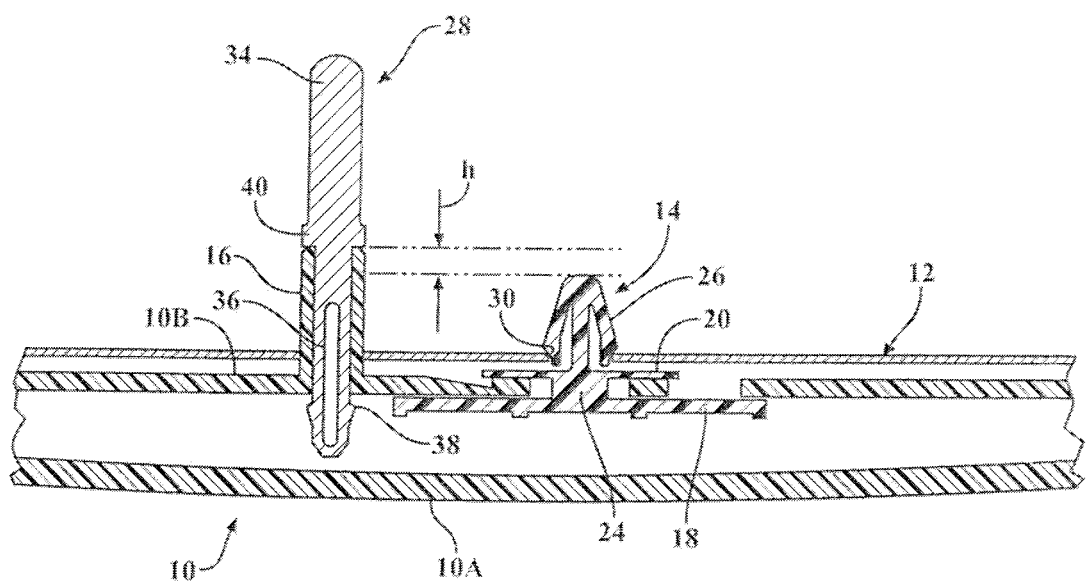
FIG. 1 is a sectional side elevation view of a host component assembled to a second component with an aligned locator and attachment clip, in accordance with the present invention.
Figure 2:
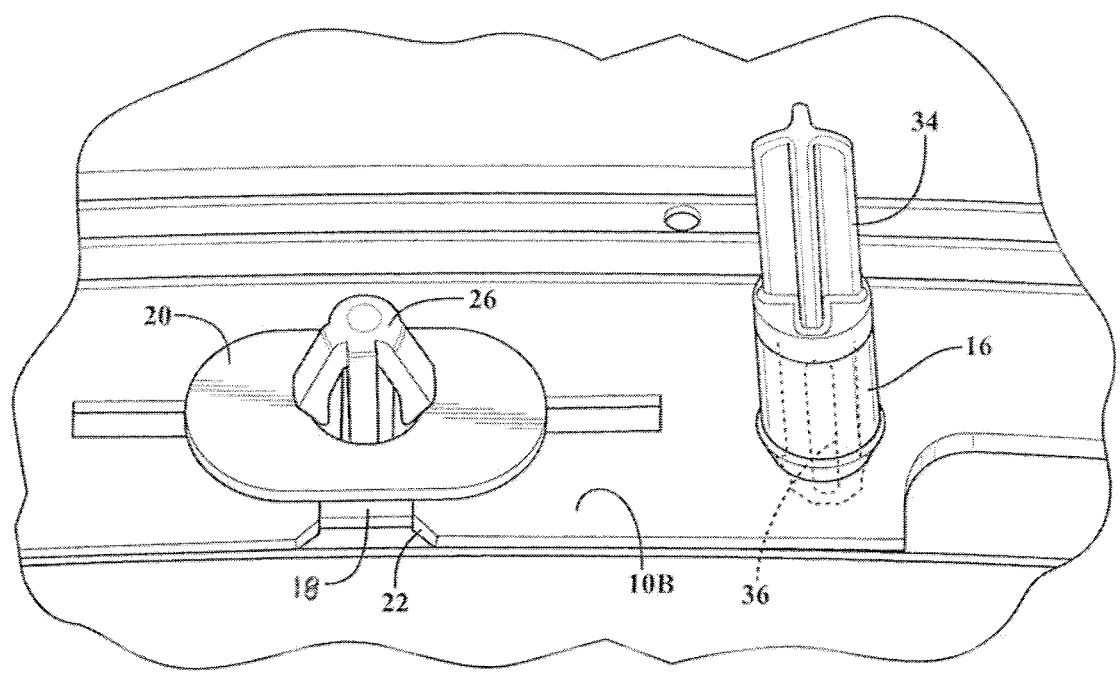
FIG. 2 is a top perspective view of the final assembly of FIG. 1, with the second component omitted for clarity, illustrating the host part connected to the attachment clip and a locator guide extension with a portion, shown in phantom, connected to the locator of the host component, according to the present invention.
Figure 4:
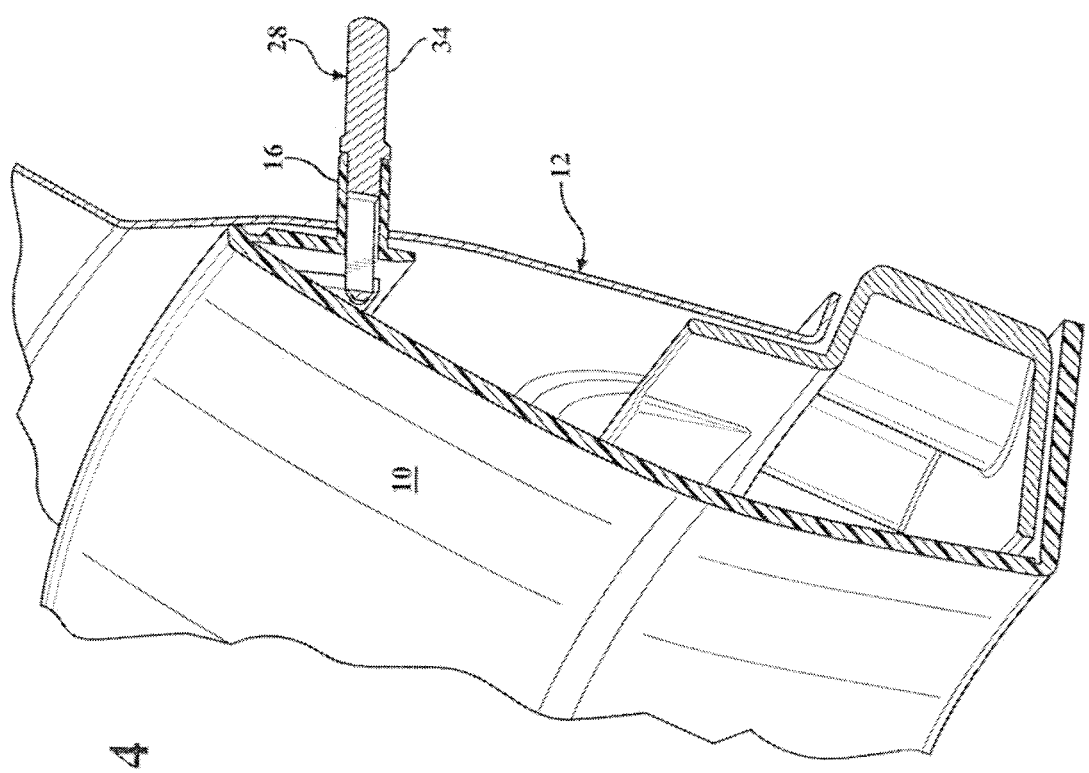
FIG. 4 is a perspective view of the host part assembled to the second component illustrating the aligned locator and locator guide extension, in accordance with the present invention.
Figure 3:
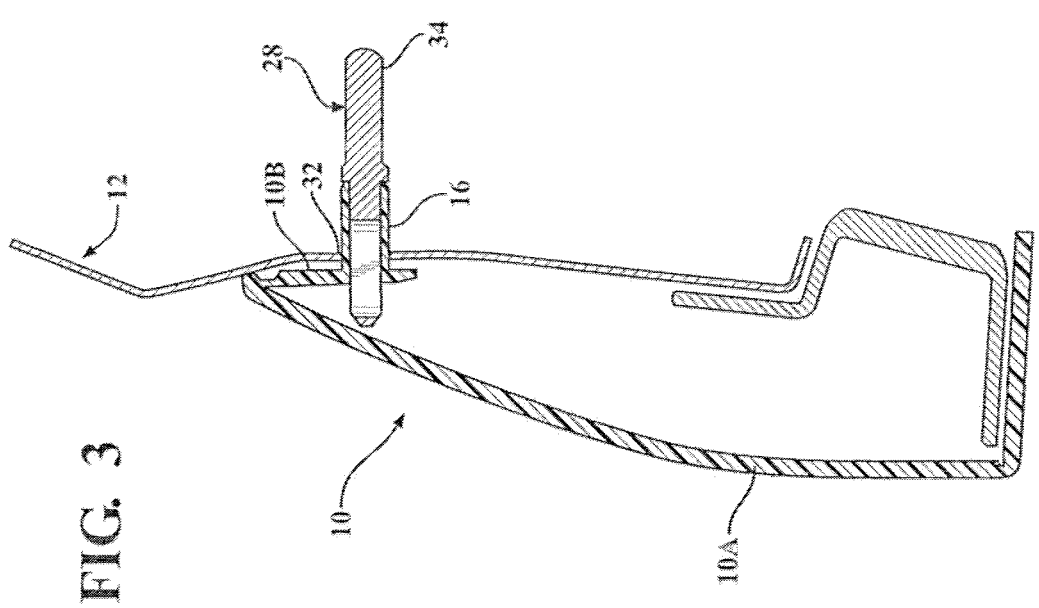
FIG. 3 is a sectional side elevation view of the host part assembled to the second component illustrating the aligned locator and locator guide extension, in accordance with the present invention.

FIG. 1 shows an exemplary host part or component part or first part shown generally at 10, e.g., such as a body panel, assembled to a second part shown generally at 12, e.g., such as a sheet metal body of a vehicle or plastic, composite or other body of the vehicle. According to an embodiment of the present invention, the host part 10 has a at least one first surface 10A, and has at least one second surface 10B that provides attachment location(s) to the second part 12. In a preferred embodiment, the host part 10 has at least one show Class A surface 10A and at least one a non-show surface 10B. Other surfaces are contemplated depending on the particular application without departure from the scope of the present invention. According to an embodiment of the present invention, the non-show surface 10B is a flange.

At least one attachment member shown generally at 14 is operably connected to the host part 10 for connecting the host part 10 to the second part 12. Most preferably, the attachment member is an attachment clip 14. At least one locator shown generally at 16 is integrally formed with the host part 10. The locator 16 is preferably a molded in locator extending from the host part 10, most preferably, extending from the second surface 10B in a direction generally away from the adjacent first surface 10A. During assembly, each locator 16 of the host part 10 aligns with a respective aperture 32 provided in the second part 12. This provides alignment of the host part 10 to the second part 12. The locator 16 provides the final fit/finish location, and helps assure correct attachment clip 14 engagement with respective apertures and part fit between the component part 10 and second part 12.

Each attachment clip 14 includes at least a base portion 18 and at least one retention or washer portion 20 spaced a predetermined distance apart from each other, by a connecting post 24, for connecting to the host part 10. Preferably, the host part 10 has at least one slot 22 to slideably receive the respective post 24 of the attachment clip 14. The attachment clip 14 has a winged clip 26 that pushes through a prespective aperture 30 provided in the second part 12, thereby connecting the host part 10 to the second part 12. The top of the winged clip 26 is at or near the same height as the top of the locator 16. FIG. 1 shows an exemplary horizontal plan between the two being a predetermined distance, illustrated as 'h', however, the distance can be more or less or the same. The minimal difference in length or height between the top of the winged clip 26 and locator 16 make it extremely difficult for the locators to find their respective holes 32 in the second part 12 prior to the attachment clips 14, which results in a higher risk of the attachment clips 14 not engaging with their respective apertures 30 in the second part 12, and part fit being compromised.

At least one alignment feature shown generally at 28 is provided that operably connects to the locator 16 for increasing the overall length or height to more easily align the locators 16 to the second part 12 apertures 32. In a preferred embodiment, the alignment feature is a locator guide extension 28 including a first half 34 integrally formed with a second half 36, where the first half 34 extends above the locator 16 to provide the additional length/height needed for initial alignment of the host part 10 to the second part 12. In particular, each locator guide extension 28 initially aligns with a respective one of the plurality of apertures 32 of the second part 12. After that initial alignment, the host part 10 is pushed further to bring both the locator guide extension 28 and the locator 16 through the aperture 32, the locator 16 providing the final fit/finish location. Once the locator 16 is inserted a predetermined amount into the aperture 32, the attachment clip 14 is also inserted into the respective aperture 30 for the clip 14.

The second half 36 of the locator guide extension 28 operably connects to the locator 16. In a preferred embodiment, the second half 36 extends through a bore formed in the locator 16 and is held in place by at least one attachment feature 38. Preferably, the second half 36 has a built-in means of detent to provide retention. Most preferably, the second half 36 has at least one retention barb 38 which snaps in place when pushed through the bore of the locator 16 such that the locator guide extension 28 cannot back out of the locator 16. Preferably, at least one larger diameter part, flange, annullet, ring or the like, shown as 40, is provided on the locator guide extension 28 to contact the top of the locator 16 preventing the second half 36 from extending into the bore of the locator 16. The second half 36 is integrally formed with a plurality of splines 42, preferably, at least four splines generally forming an 'x' shape, according to an embodiment of the present invention.

Any other attachment clip 14 or other attachment fasteners of any kind, and corresponding second part attachment features, are contemplated depending on the particular application without departing from the scope of the present invention.

The locator guide extension and features of the present invention are adaptable for any assembled components, including, but not limited to, vehicle assemblies, trim, panels, automotive trim panels, body panels, or any other components.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A component retention system, comprising:
a component part having at least one locator integrally formed with the component part and adapted to locate the component part to a second part;
at least one attachment clip operably coupled to the component part for connecting to the second part;
at least one locator guide extension, where each locator guide extension is operably connected to one of the at least one locator, said locator guide extension adapted for providing initial alignment of the component part to respective apertures of the second part before the at least one locator provides the final locating;
wherein each locator guide extension includes a first half integrally formed with a second half, where the second half is housed within a bore of the locator.

2. The component retention system of claim 1, wherein each locator guide extension includes a first half integrally formed with a second half, where the first half extends outward from a top of each locator to provide the initial alignment to the aperture of the second part.

3. The component retention system of claim 1, wherein the locator guide extension further comprises at least one retention barb to retain the locator guide extension within the locator.

4. The component retention system of claim 3, wherein the locator guide extension further comprises at least one self-detent feature to push through the locator and snap into place to retain the locator guide extension within the locator.

5. The component retention system of claim 1, wherein the locator guide extension further comprises a larger diameter portion than the locator to contact a top of the locator to keep the first half above the locator.

6. The component retention system of claim 1, wherein the attachment clips are connected to the second part via second apertures in the second part once the locators are aligned with the apertures for the locators.

7. The component retention system of claim 1, wherein the at least one locator guide extension brings a plurality of attachment members into substantial alignment with a plurality of connection locations, respectively, on the second part.

8. The component retention system of claim 7, wherein each of the plurality of attachment members are held within slots formed on a non-show surface of the component part, and, inserted into a plurality of apertures formed in the second part after initial alignment and the locator provides final fit/finish location.

9. A component retention system for alignment of components of an assembly, comprising:
- a locator guide extension having a first portion with a larger diameter portion than a locator, and a second portion having a retention portion, said second portion retained within a hollow housing of the locator of a component part;
- wherein the larger diameter portion contacts a top of the locator to keep the first half outside the locator;
- wherein said locator guide extension is adapted to provide initial alignment of the component part to respective apertures of a second part of the component retention assembly and the housing of the at least one locator is adapted to fit through the aperture to provide a final fit/finish location for at least one attachment clip to connect the component part to the assembly.

10. The component retention system of claim 9, wherein the locator guide extension further comprises a self-detent feature to push through the locator and snap into place to retain the locator guide extension within the locator.

11. The component retention system of claim 9, wherein the retention portion comprises at least one retention barb to retain the locator guide extension within the locator.

12. A component retention system for connecting aligned components of a vehicle assembly, comprising:
- a first part;
- a second part selectively assembled to the first part and having at least one aperture;
- at least one locator guide extension coupled to the first part, each of the at least one locator guide extensions being insertable into a respective one of the at least one apertures for initial alignment of the first part to the second part;
- at least one attachment member selectively securing the connection of the first part to the second part;
- at least one locator provided on the first part and each connected to the at least one locator guide extension, wherein the locator provides final fit/finish location for the attachment member to connect to the second part; and
- wherein the locator guide extension is a single component that inserts into a hollow boss locator on the first part and is held in the locator by at least one attachment feature.

13. The locator system of claim 12, wherein the at least one locator guide extension brings a plurality of attachment members into substantial alignment with a plurality of connection locations, respectively, on the second part.

14. The locator system of claim 13, wherein each of the plurality of attachment members are held within slots formed on a non-show surface of the first part, and, inserted into a plurality of apertures formed in the second part after initial alignment and the locator provides final fit/finish location.

15. The locator system of claim 12, wherein the attachment member is a winged clip.

16. The locator system of claim 12, wherein the locator guide extension has a first portion for alignment and a second portion that inserts into a hollow boss locator on the first part and snaps into place with a plurality of retention barbs.

17. The locator system of claim 16, wherein the locator guide extension includes an annulet portion having a larger diameter than the locator to prevent the first portion of the locator guide extension from entering the locator.

* * * * *